United States Patent
Lee

(10) Patent No.: US 10,087,777 B2
(45) Date of Patent: Oct. 2, 2018

(54) LUBRICANT COOLING SYSTEMS FOR HIGH SPEED TURBOMACHINES

(71) Applicant: Hamilton Sundstrand Corporation, Charlotte, NC (US)

(72) Inventor: Vincent Lee, Cypress, TX (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 208 days.

(21) Appl. No.: 15/142,452

(22) Filed: Apr. 29, 2016

(65) Prior Publication Data

US 2017/0314413 A1   Nov. 2, 2017

(51) Int. Cl.
| | |
|---|---|
| *F01D 25/12* | (2006.01) |
| *F01D 25/20* | (2006.01) |
| *F02C 7/06* | (2006.01) |
| *F02C 7/14* | (2006.01) |
| *F02C 7/18* | (2006.01) |
| *F02C 9/18* | (2006.01) |

(52) U.S. Cl.
CPC ............. *F01D 25/12* (2013.01); *F01D 25/20* (2013.01); *F02C 7/06* (2013.01); *F02C 7/14* (2013.01); *F02C 7/185* (2013.01); *F02C 9/18* (2013.01); *F05D 2220/32* (2013.01); *F05D 2260/213* (2013.01); *F05D 2260/232* (2013.01); *F05D 2260/98* (2013.01)

(58) Field of Classification Search
CPC .. F01D 25/12; F01D 25/20; F02C 7/06; F02C 7/14; F02C 7/185; F02C 9/18; F05D 2220/32; F05D 2260/213; F05D 2260/232; F05D 2260/98
See application file for complete search history.

(56) References Cited

U.S. PATENT DOCUMENTS

| | | |
|---|---|---|
| 5,511,374 A | 4/1996 | Glickstein et al. |
| 6,415,595 B1 | 7/2002 | Wilmot, Jr. et al. |
| 9,051,056 B2 | 6/2015 | Leese |
| 9,284,057 B2 | 3/2016 | Kelnhofer |

(Continued)

FOREIGN PATENT DOCUMENTS

| | | |
|---|---|---|
| WO | WO-2014051678 A1 | 4/2014 |
| WO | WO-2014200587 A2 | 12/2014 |
| WO | WO-2015122949 A2 | 8/2015 |

OTHER PUBLICATIONS

Extended European Search Report prepared, of the European Patent Office, dated Sep. 19, 2017, issued in corresponding European Patent Application No. 17164220.0.

*Primary Examiner* — William E Dondero
*Assistant Examiner* — Robert T Reese
(74) *Attorney, Agent, or Firm* — Locke Lord LLP; Daniel J. Fiorello; Scott D. Wofsy

(57) ABSTRACT

A system for cooling lubricant in a turbomachine includes a lubricant circuit for circulating a turbomachine lubricant, an air/oil cooler disposed in thermal communication with the lubricant circuit and configured to cool a turbomachine lubricant in the lubricant circuit by passing air over the air/oil cooler, and a compressor air circuit in fluid communication with the air/oil cooler and configured to supply air from a compressor of the turbomachine to the air/oil cooler. The compressor air circuit can include an expansion section to expand and cool air before effusing air to the air/oil cooler.

7 Claims, 1 Drawing Sheet

(56) References Cited

U.S. PATENT DOCUMENTS

| | | | |
|---|---|---|---|
| 2015/0192033 A1* | 7/2015 | Garassino | F02C 7/14 |
| | | | 62/468 |
| 2015/0247462 A1* | 9/2015 | Suciu | F02K 3/115 |
| | | | 415/1 |
| 2016/0017751 A1* | 1/2016 | Caruel | F02C 7/047 |
| | | | 415/175 |
| 2016/0024968 A1* | 1/2016 | Stearns | F01D 25/12 |
| | | | 60/39.08 |
| 2016/0312703 A1* | 10/2016 | Ribarov | F01D 25/12 |
| 2017/0335769 A1* | 11/2017 | Boujida | F02C 7/14 |
| 2018/0009536 A1* | 1/2018 | Christopherson | B64D 13/06 |

* cited by examiner

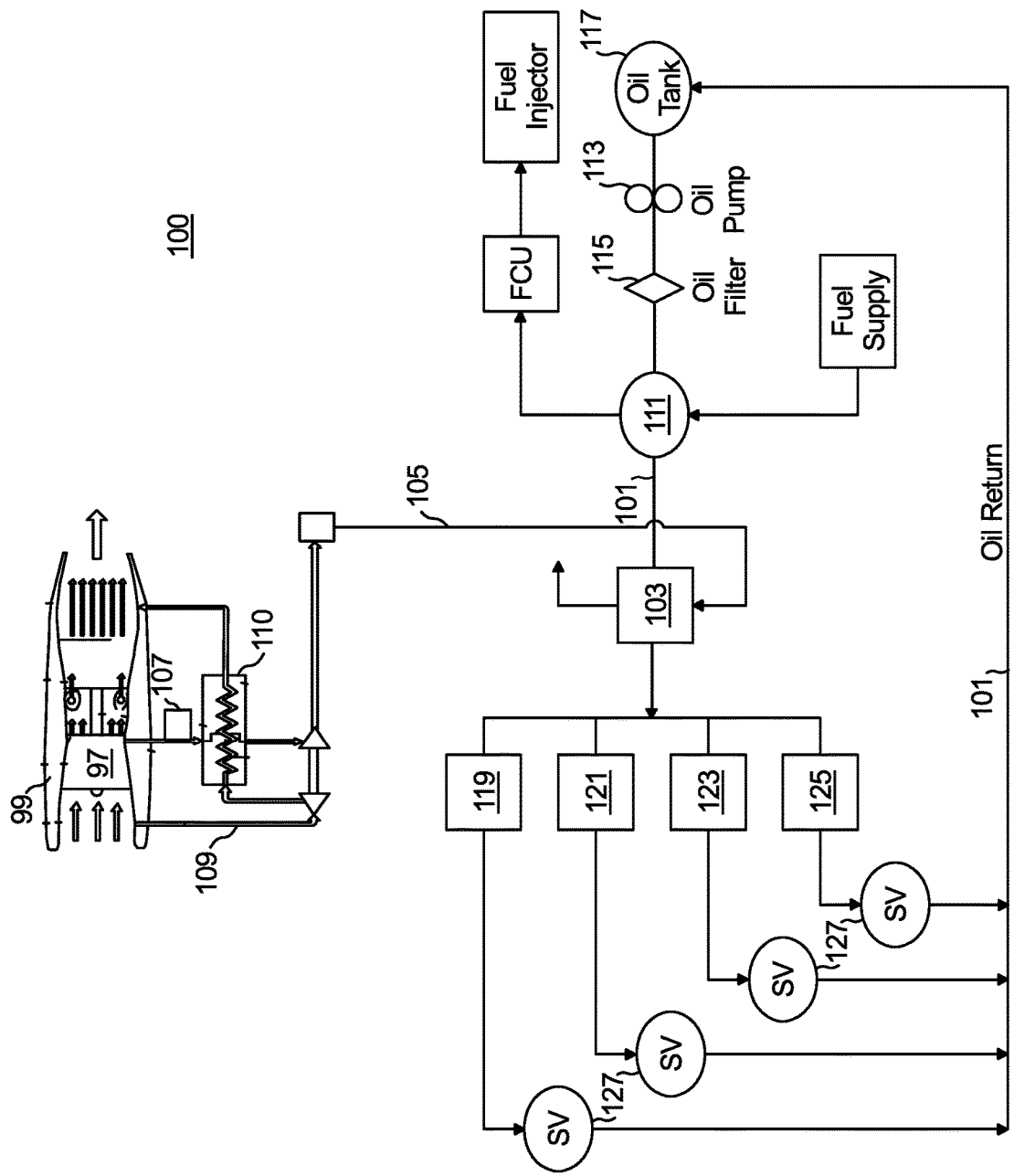

LUBRICANT COOLING SYSTEMS FOR HIGH SPEED TURBOMACHINES

BACKGROUND

1. Field

The present disclosure relates to turbomachines, more specifically to lubricant systems for high speed turbomachines.

2. Description of Related Art

In the near future, there will be many aircraft (military or commercial applications) flying at Mach 2+ to Mach 3+. Ram air temperatures to the engine inlet will be high at these high speeds. The detrimental effect to the bearing compartment is that very high buffer air temperatures will be provided to the bearing compartments which will cause high oil and bearing temperatures.

The conventional methods and systems have generally been considered satisfactory for their intended purpose under lower speed applications. However, there is still a need in the art for improved lubricant cooling systems when high speed applications are involved. The present disclosure provides a solution for this need.

SUMMARY

A system for cooling lubricant in a turbomachine includes a lubricant circuit for circulating a turbomachine lubricant, an air/oil cooler disposed in thermal communication with the lubricant circuit and configured to cool a turbomachine lubricant in the lubricant circuit by passing air over the air/oil cooler, and a compressor air circuit in fluid communication with the air/oil cooler and configured to supply air from a compressor of the turbomachine to the air/oil cooler. The compressor air circuit can include an expansion section to expand and cool air before effusing air to the air/oil cooler.

The system can further include a fuel/oil cooler configured to cool a turbomachine lubricant. The fuel/oil cooler can be disposed upstream of the air/oil cooler relative to a direction of flow of the turbomachine lubricant in the lubricant circuit.

The system can further include a ram air inlet in fluid communication with the air/oil cooler for routing ram air over the air/oil cooler. An oil pump can be configured to pump the turbomachine lubricant in the lubricant circuit.

A method for cooling turbomachine lubricant in a lubricant circuit can include providing cooled air to an air/oil cooler of the turbomachine. Providing cooled air can include bleeding compressor air from a compressor of the turbomachine and cooling the compressor air to create the cooled air.

Cooling the compressor air can further include expanding the compressor air to cool the compressor air to provide the cooled air. The method can include providing fuel to a fuel/oil cooler, the fuel/oil cooler disposed in the lubricant circuit upstream of the air/oil cooler relative to a direction of flow of the turbomachine lubricant in the lubricant circuit.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain FIGURES, wherein:

The FIGURE is a system view of an embodiment of a system in accordance with this disclosure.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in the FIGURE and is designated generally by reference character 100. The systems and methods described herein can be used to cool lubricant in a turbomachine (e.g., even at supersonic and hypersonic speeds).

Referring to the FIGURE, a system 100 for cooling lubricant in a turbomachine (e.g., turbomachine 99) includes a lubricant circuit 101 for circulating a turbomachine lubricant (e.g., turbomachine oil). An air/oil cooler 103 is disposed in thermal communication with the lubricant circuit 103 and is configured to cool a turbomachine lubricant in the lubricant circuit 101 by passing air over the air/oil cooler 103.

The system 100 also includes a compressor air circuit 105 in fluid communication with the air/oil cooler 103 which is configured to supply air from a compressor 97 of the turbomachine 99 to the air/oil cooler 103. The compressor air circuit 105 can include an expansion section 107 to expand and cool air before effusing air to the air/oil cooler 103.

The system 100 can further include a ram air inlet 109 in fluid communication with the air/oil cooler 103 for routing ram air over the air/oil cooler 103. As shown in the FIGURE, the ram air inlet 109 can be in thermal communication with the compressor air circuit 105 and/or in fluid communication with the compressor air circuit 105 such that ram air and compressor air can be communicated thermally (e.g., via air/air cooler 110 as shown) and/or fluidly (e.g., via mixing) before reaching the air/oil cooler 103. In this regard, the ram air can be cooled by the compressor air before being used to cool the air/oil cooler 103.

The system 100 can further include a fuel/oil cooler 111 in thermal communication with the turbomachine lubricant in the lubricant circuit 101. The fuel/oil cooler 111 can be configured to cool the turbomachine lubricant by passing fuel from a fuel supply over the fuel/oil cooler 111. As shown, the fuel/oil cooler 111 can be disposed upstream of the air/oil cooler 103 relative to a direction of flow of the turbomachine lubricant in the lubricant circuit 101, but any other suitable position is contemplated herein. The fuel can be pump by the fuel control unit (FCU) over the fuel/air cooler 111 before being effused into the fuel injector of the turbomachine 99).

An oil pump 113 can be configured to pump the turbomachine lubricant in the lubricant circuit 101. Any other suitable components (e.g., lubricant filter 115, oil tank 117 for return lubricant). The lubricant circuit 101 can be configured to pass lubricant over/through any suitable components in the engine that need lubrication (e.g., a front bearing compartment 119, a middle bearing compartment 121, a rear bearing compartment 123, a gearbox 125). As shown, each line can include a scavenger pump 127 downstream of each component.

In accordance with at least one aspect of this disclosure, a method for cooling turbomachine lubricant in a lubricant circuit can include providing cooled air to an air/oil cooler 103 of the turbomachine 99. Providing cooled air can include bleeding compressor air from a compressor 97 of the turbomachine 99 and cooling the compressor air to create the cooled air.

Cooling the compressor air can further include expanding the compressor air to cool the compressor air to provide the cooled air. The method can include providing fuel to a fuel/oil cooler 111, the fuel/oil cooler 111 disposed in the lubricant circuit 101 upstream of the air/oil cooler relative to a direction of flow of the turbomachine lubricant in the lubricant circuit 101.

Embodiments as described above use cooled cooling air (e.g., similar to air conditioned air) to cool the air/oil cooler 103. For example, the ram air (which can be hot when flying at Mach 2+ speeds) can be cooled via the air/air cooler 110 or mixing with the expanded compressor air. The operating temperatures of lubricant inside a supersonic/hypersonic engine can then be controlled and acceptable. Additionally, the fuel/oil cooler 111 can be used to have low temperature fuel absorb heat generated by the lubricant system.

The methods and systems of the present disclosure, as described above and shown in the drawings, provide for lubricant cooling systems with superior properties including the ability to cool turbomachines operating at Mach 2+, for example. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A system for cooling lubricant in a turbomachine, comprising:
   a lubricant circuit for circulating a turbomachine lubricant;
   an air/oil cooler disposed in thermal communication with the lubricant circuit and configured to cool a turbomachine lubricant in the lubricant circuit by passing air over the air/oil cooler; and
   a compressor air circuit in fluid communication with the air/oil cooler and configured to supply air from a compressor of the turbomachine to the air/oil cooler, wherein the compressor air circuit includes an expansion section to expand and cool air before effusing air to the air/oil cooler.

2. The system of claim 1, further comprising a fuel/oil cooler configured to cool a turbomachine lubricant.

3. The system of claim 2, wherein the fuel/oil cooler is disposed upstream of the air/oil cooler relative to a direction of flow of the turbomachine lubricant in the lubricant circuit.

4. The system of claim 1, further comprising a ram air inlet in fluid communication with the air/oil cooler for routing ram air over the air/oil cooler.

5. The system of claim 1, further comprising an oil pump is configured to pump the turbomachine lubricant in the lubricant circuit.

6. A method for cooling turbomachine lubricant in a lubricant circuit, comprising:
   providing cooled air to an air/oil cooler of the turbomachine which includes bleeding compressor air from a compressor of the turbomachine and cooling the compressor air to create the cooled air,
   wherein cooling the compressor air further includes expanding the compressor air in an expander section of a compressor air circuit before effusing fuel to the air/oil cooler to cool the compressor air to provide the cooled air.

7. The method of claim 6, further comprising:
   providing fuel to an fuel/oil cooler, the fuel/oil cooler disposed in the lubricant circuit upstream of the air/oil cooler relative to a direction of flow of the turbomachine lubricant in the lubricant circuit.

* * * * *